United States Patent
Ishida

(10) Patent No.: US 6,746,043 B2
(45) Date of Patent: Jun. 8, 2004

(54) PASSENGER PROTECTION APPARATUS FOR A MOTOR VEHICLE

(75) Inventor: Shoichi Ishida, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/145,133

(22) Filed: May 15, 2002

(65) Prior Publication Data

US 2002/0195807 A1 Dec. 26, 2002

(30) Foreign Application Priority Data

Jun. 20, 2001 (JP) ........................... 2001-186729

(51) Int. Cl.[7] ............................................. B60R 21/32
(52) U.S. Cl. ........................................... 280/735; 701/45
(58) Field of Search ......................... 280/735; 180/273; 701/45–47

(56) References Cited

U.S. PATENT DOCUMENTS

| | | | | |
|---|---|---|---|---|
| 4,166,641 A | * | 9/1979 | Okada et al. ............... | 280/735 |
| 5,413,378 A | * | 5/1995 | Steffens et al. ............. | 280/735 |
| 5,482,314 A | * | 1/1996 | Corrado et al. ............. | 280/735 |
| 6,070,687 A | * | 6/2000 | Wallace et al. ............. | 180/287 |
| 6,078,854 A | * | 6/2000 | Breed et al. ................. | 701/49 |
| 6,116,639 A | * | 9/2000 | Breed et al. ................. | 280/735 |
| 6,242,701 B1 | * | 6/2001 | Breed et al. ................. | 177/144 |

FOREIGN PATENT DOCUMENTS

JP      A 11-1153      1/1999

* cited by examiner

Primary Examiner—Michael J. Carone
Assistant Examiner—Bret Hayes
(74) Attorney, Agent, or Firm—Oliff & Berridge, PLC

(57) ABSTRACT

An airbag system having a crash sensor generates a crash trigger signal when a crash is detected. A passenger detected system detects at least a passenger in the motor vehicle to generate data regarding the passenger. In response to the crash trigger signal, a latest piece of the data regarding the passenger is held in non-volitile memory when the crash is detected to provide the data for the accident analysis.

15 Claims, 3 Drawing Sheets

PASSENGER PROTECTION APPARATUS FOR A MOTOR VEHICLE

BACKGROUND OF THE INVENTION

1. Field of the Invention

This invention relates to a passenger protection apparatus for a motor vehicle with a data recording function.

2. Description of the Prior Art

An airbag unit in which the expansion is controlled in accordance with the detected weight of the passenger is disclosed in Japanese patent application provisional publication No. 11-01153. FIG. 3 shows this prior art airbag system.

The airbag unit 90 includes a gas generation unit with a plurality of inflators 92 which generate gas in response to a controller 70. The controller 70 is supplied with a crash detection signal from a crash sensor 80 and with weight detection signals from weight sensors 71 to 74. When the crash sensor detects a crash, the controller 70 determines the number of inflators to be operated in accordance with the weight determined from the weight detection signals from the weight sensors 71 to 74 and sends the result to the airbag unit 90. This operates the determined number of inflators 92 to expand the airbags 91.

This airbag unit 90 can control the expansion of the airbags to reduce the possibility of airbag side effect.

On the other hand, if a crash accident occurs, data regarding the passenger was not left because of no drive recorder like a flight recorder in an aircraft. That is, it is required to record the data regarding the passenger at the crash accident to analyze the accident.

SUMMARY OF THE INVENTION

The aim of the present invention is to provide a superior passenger protection apparatus for a motor vehicle.

According to the present invention, a first aspect of the present invention provides a passenger protection apparatus for a motor vehicle comprising:

- an airbag system having a crash sensor and an airbag for generating a crash trigger signal when a crash is detected;
- a passenger detection system for detecting said passenger in said motor vehicle to generate data regarding said passenger; and
- data holding means having a non-volatile memory for holding said data up to said detected crash in said non-volatile memory in response to said crash trigger signal.

According to the present invention, a second aspect of the present invention provides the passenger protection apparatus based on the first aspect, wherein said passenger detection system having a passenger sensor for detecting said passenger to output a passenger sensor signal and a processing circuit for processing said passenger sensor signal to periodically output said data and an intermediate processing result obtained while said sensor signal is processed, and wherein said data holding means further holds said intermediate results up to said detected crash when said crash is detected.

According to the present invention, a third aspect of the present invention provides the passenger protection apparatus based on the first aspect, wherein said airbag system further comprises an airbag electronic control unit responsive to said crash trigger signal, said airbag being controlled by said airbag electronic control unit, and said passenger detection system comprises a passenger sensor for detecting said passenger to output a passenger sensor signal and a passenger electronic control unit for processing said passenger sensor signal to generate said data.

According to the present invention, a fourth aspect of the present invention provides the passenger protection apparatus based on the third aspect, wherein said airbag electronic control unit includes an acceleration sensor, an airbag control central processing unit, and an airbag communication interface, and said passenger detection electronic control unit includes a memory, a passenger detection central processing unit, and a passenger detection communication interface coupled to said airbag communication interface.

According to the present invention, a fifth aspect of the present invention provides the passenger protection apparatus based on the fourth aspect, wherein said airbag electronic control unit processes the outputs from said crash sensor and said acceleration sensor to generate an operation value indicative of a magnitude of crash and generates said crash trigger signal when said operation value exceeds a light crash level and sends said crash trigger signal only to said passenger detection electronic control unit and supplies said crash trigger signal to said passenger detection electronic control unit and to said airbag when said operation value exceeds a heavy crash level which is higher than said light crash level.

According to the present invention, a sixth aspect of the present invention provides the passenger protection apparatus based on the third aspect, wherein when said passenger detection electronic control unit receives said crash trigger signal, said passenger detection electronic control unit sends said data to said airbag electronic control unit, and when said airbag electronic control unit control said airbag on the basis of the received data from said passenger detection electronic control unit.

According to the present invention, a seventh aspect of the present invention provides the passenger protection apparatus based on the first aspect, wherein said data holding means holds a latest piece of said data in said non-volatile memory when said crash is detected.

According to the present invention, an eighth aspect of the present invention provides the passenger protection apparatus based on the first aspect, wherein said data holding means periodically holds said data in said non-volatile memory and inhibits rewriting said data in said non-volatile memory when said crash is detected.

According to the present invention, a ninth aspect of the present invention provides the passenger protection apparatus based on the first aspect, wherein said data holding means has a temporary memory, periodically holds said data in said temporary memory, and holds the data from said temporary memory in said non-volatile memory in response to said crash trigger signal.

According to the present invention, a tenth aspect of the present invention provides the passenger protection apparatus based on the first aspect, wherein said passenger detection system includes a sensor for detecting a load by said passenger, said data holding means holds said output of said sensor as said data.

According to the present invention, an eleventh aspect of the present invention provides the passenger protection apparatus based on the first aspect, wherein said passenger detection system includes a sensor for detecting a load by said passenger and processes an output of the sensor to have a waveform-shaped signal, said data holding means holds a result from said processed output as said data.

According to the present invention, a twelfth aspect of the present invention provides the passenger protection apparatus based on the first aspect, further comprising a processing circuit for processing a sensor signal from said crash sensor to output processing result, wherein said data holding means further holds said processing result in said non-volatile memory just after said detected crash in response to said crash trigger signal.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
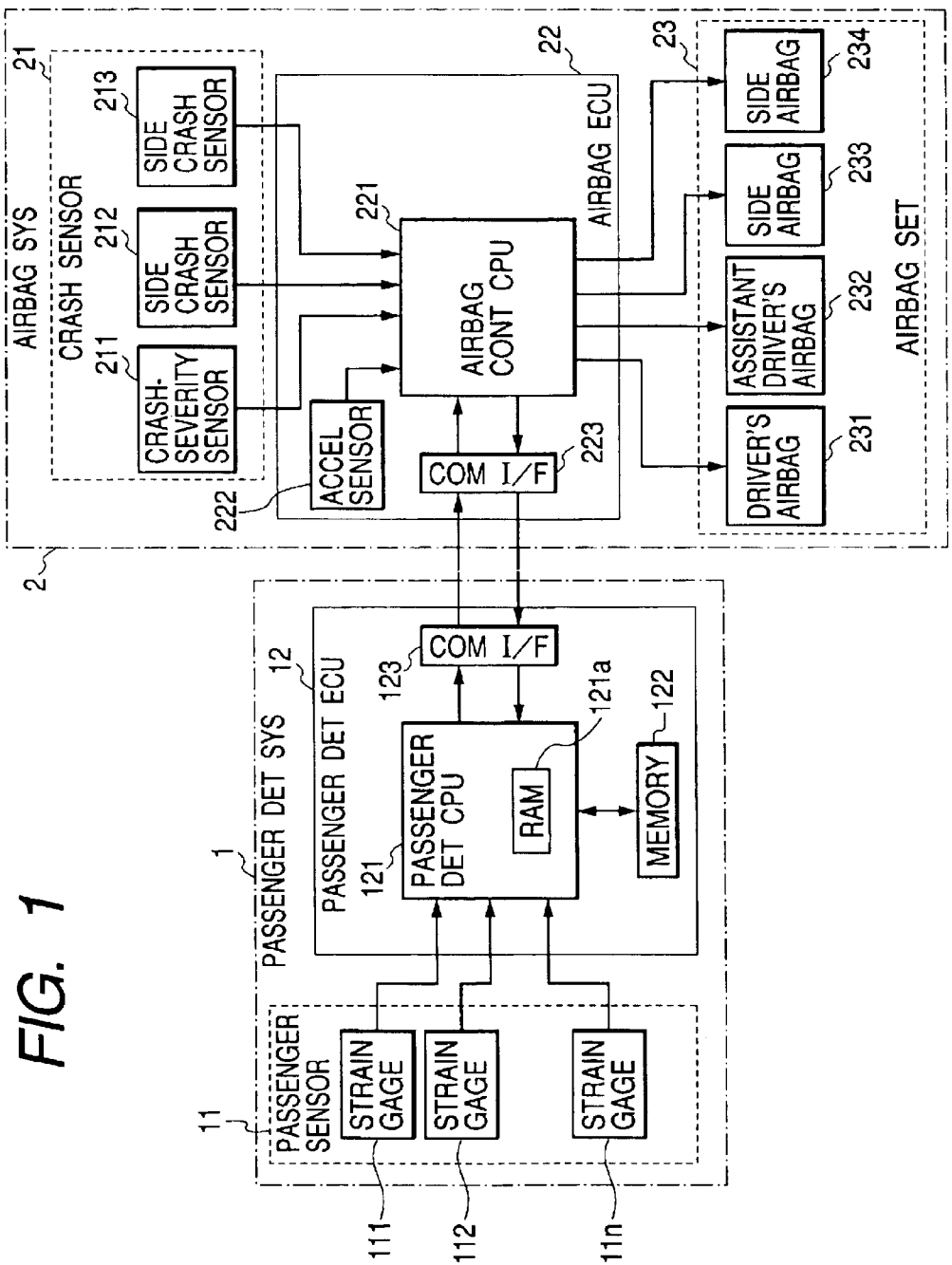
FIG. 1 is a block diagram of a passenger protection apparatus according to this invention.

FIG. 1 is a block diagram of the passenger protection apparatus according to this invention. FIGS. 2A to 2E are time charts of a passenger sensor output, a crash sensor processing output, crash trigger signals, and a type-of-passenger output, respectively.

The passenger detection system 1 includes a passenger sensor 11 and a passenger detection electronic control unit (ECU) 12 coupled to the passenger sensor 11. The passenger detection electronic control unit 12 includes a passenger detection central processing unit (CPU) 121, a memory 122, and a communication interface 123.

The passenger sensor 11 compromises Cu—Ni strain gages 111, 112, to 11n arranged in an assistant driver's seat frame for outputting signals of which magnitudes are proportional to loads applied thereto. The memory 122 comprises an EEPROM as a non-volitile memory. here, the strain gages may be further provided at driver's seat.

Figure 2A:
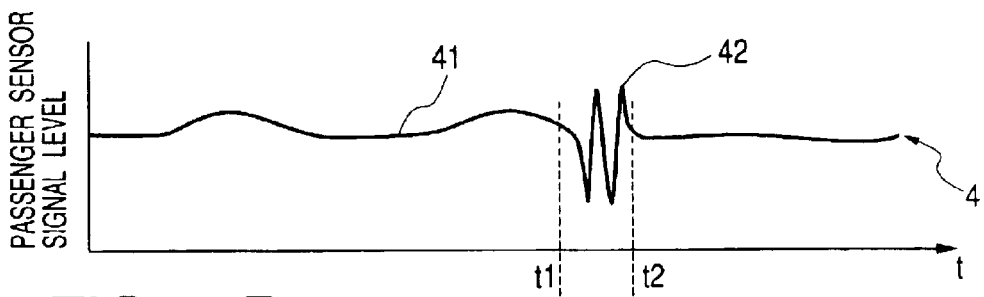
FIG. 2A is a time chart of a passenger sensor output according to this invention.
Figure 2B:
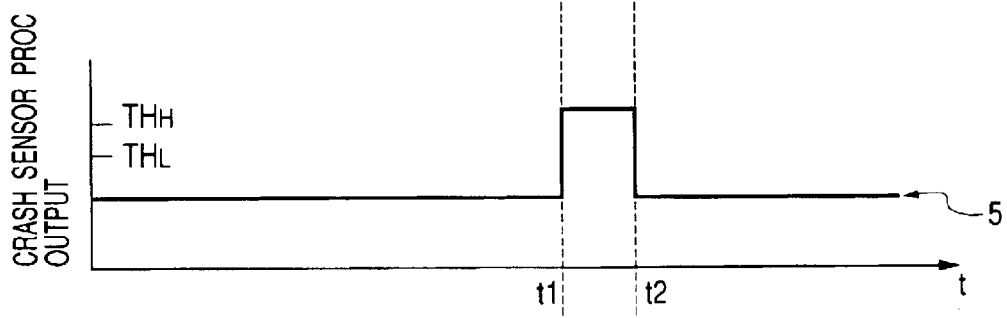
FIG. 2B is a time chart of a crash sensor processing output according to this invention.
Figure 2C:
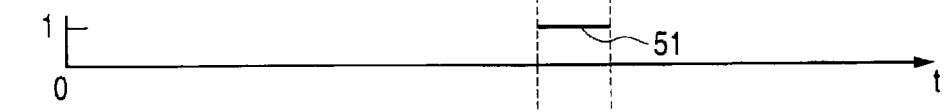
FIGS. 2C and 2D are time charts of crash trigger signals according to this invention.
Figure 2D:
Figure 2E:
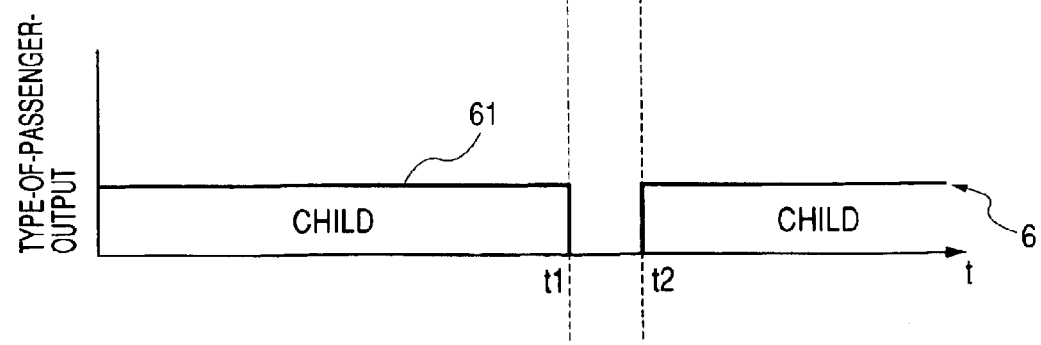
FIG. 2E is a time chart of a type-of-passenger output, respectively according to this invention.
Figure 3:
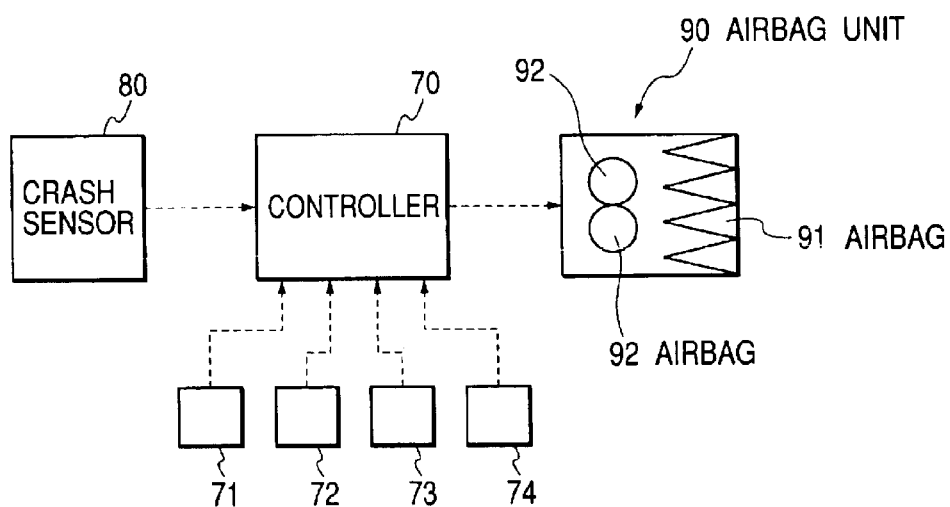
FIG. 3 is a block diagram of a prior art airbag system.

The passenger detection central processing unit 121 successively executes an operation process to detect the type of the passenger in accordance with the passenger sensor signal 4, i.e., classifies the passenger in type into an adult (heavy), a children (light), or vacancy (substantially no load), as shown in FIG. 2E.

The air bag CPU 221 detects a crash (between timings t1 and t2) and sends a crash trigger signal 51 or 51b and the crash sensor processing output 5 to the passenger detection CPU 121. When the passenger detection CPU 121 receives the crash trigger signal 51 or 51b (FIGS. 2C and 2D), the passenger detection CPU 121 stores the passenger sensor signal 4 showing the waveform 41 and the type-of-passenger signal 6 (FIG. 2E) in the memory 122 up to the crash detection, that is, stores the latest piece of the data regarding the passenger.

Next, the passenger detection CPU 121 sends the passenger sensor signal 4 and the type-of-passenger signal 6 to the airbag system 2. Here, in FIG. 2A, the passenger sensor signal 4 strongly varies during the crash (between timings t1 and t2) as shown by the waveform 42 in comparison with the waveform 41 prior to the crash.

The airbag system 2 for sending the crash sensor processing output 5 and the crash trigger signal 51 or 51b to the passenger detection system 1 comprises a crash sensor 21, an airbag set 23, and an airbag electronic control unit 22 which is coupled to the crash sensor 21 and the airbag set 23. The airbag set 23 includes a driver's airbag 231, an assistant driver's airbag 232, and side airbags 233 and 234.

The crash sensor 21 includes a crash-severity sensor 211 arranged at the front of the motor vehicle, side crash sensors 212, and 213 arranged at the driver's side door and the assistant driver's side door. These sensors have semiconductor strain gage structures to output sensor signals, which are proportional to the magnitude of the impact.

The acceleration sensor 222 has the semiconductor strain gage structure also, but outputs the acceleration sensor signal of which magnitude is proportional to that of acceleration.

The airbag control CPU 221 executes the operation process with the acceleration sensor signal and with sensor signals of the crash sensor 21 to output the crash sensor processing output 5 representative of the magnitude of the crash. When the crash sensor processing output 5 exceeds a predetermined light crash level $TH_L$, the airbag control CPU 221 sends the crash trigger signal 51b (FIG. 2D) to the passenger detection CPU 121 through the (bi-directional) communication interface 223 and the communication interface 123.

Moreover, when the crash sensor processing output 5 exceeds a predetermined heavy crash level $TH_H$, the airbag control CPU 221 judges whether the crash is of front crash or of side crash. If the crash is of a side crash, the airbag control CPU 221 judges which one of the driver's-side side crash or the assistant driver's-side side crash occurs. Moreover, the airbag control CPU 221 judges which one of the airbags is to be expanded from the passenger sensor signal 4 and the type-of-passenger signal 6 from the passenger detection system 1. At the same time, the airbag control CPU 221 sends the crash trigger signal 51 and the crash sensor processing output 5 to the passenger detection CPU 121 and sends the crash trigger signal 51 including expansion control data to the airbag(s) 231–234 to be expanded.

As shown in FIG. 2A, the passenger protection apparatus stores the data of the passenger sensor signal 4 showing the waveform 41 prior to the crash and the type-of-passenger signal 6 showing the waveform 61 up to the instance of the crash to hold the data after the power off. Thus, the held data is readable after the crash for accident analysis.

As mentioned above, the passenger protection apparatus can hold the passenger sensor signal 41 and the crash sensor processing output 5, and the type-of-passenger up to the instance of the crash just after the crash. This will help an investigator to analyze the accident.

As mentioned above the passenger protection apparatus according to the invention holds the passenger sensor signal and a waveform-shaped signal of the passenger sensor signal (crash sensor processing output) before the reception of the crash trigger signal from the airbag system when the crash is detected. Because the held data is readable after the crash, the passenger protection apparatus can be used as a drive recorder. This makes the accident analysis easy.

Favorably, the data regarding the passenger for a predetermined interval (for example, 60 sec) just before the crash is stored in response to the crash trigger signals 51 and 51b. That is, suppressing the amount of the data regarding the passenger to be stored reduces the size of the memory 122.

The passenger detection CPU 121 successively processes the passenger sensor signal 4 step by step. That is, the passenger detection CPU 121 obtains an intermediate result and then, obtains the final result from the intermediate result. Thus, the passenger detection CPU 121 holds the final result or the intermediate result of the process in response to the crash trigger signals 51 and 51b. The final result and the intermediate result of the passenger detection process provide a more accurate accident analysis. The final result of the passenger detection process may include data indicating the sitting condition. For example, the sitting condition data indicates whether the passenger sits back in the seat, the passenger sits forward in the seat, or the passenger sits with position shift toward the door.

The airbag includes a bag and an inflator for supplying nitrogen gas to the bag to expand the bag. A plurality of inflators may be provided for each bag to control the expansion degree in accordance with the severity of the crash or the condition of the passenger.

It is desirable that a plurality of sensors are provided to detect the crash. That is, the combination of the sensor signals from the acceleration sensor 222 and the crash sensor 21 can provide judgment which one of a front crash, a slantwise crash, a side crash, and the rear crash occurs and judgment whether the crash is light or heavy.

As mentioned above, if the passenger detection CPU 121 detects the type of the passenger and the sitting condition, the expansion of airbags can be controlled in accordance with these data. For example, the passenger detection CPU 121 detects that the passenger sits forward in the seat, the airbag ECU 22 controls the expansion speed of the airbag for the assistant driver to reduce the possibility of airbag side effect.

The airbag EPU 22 operates the sensor signals from the crash sensor 21 and the acceleration sensor 222 and when the crash sensor processing output 5 exceeds the light crash level $TH_L$, the airbag ECU 22 generates the crash trigger signal 51b to supply it only to the passenger detection ECU 12. When the crash sensor processing output 5 exceeds the heavy crash level $TH_H$, the airbag ECU 22 generates the crash trigger signal 51 to supply it to the passenger detection ECU 12 and also to the airbag set 23. This prevents the expansion of the airbag on a light crash.

The crash sensor may comprise a side crash sensor 212 and crash-severity sensor 211. The airbag ECU 22 generates the crash trigger signal 51 including expansion control data in accordance with the sensor outputs from the side crash sensor 212 and the crash-severity sensor 211. This structure provides a more favorable protection than the case that only the acceleration sensor detects the crash.

Moreover, in the case of the front crash, the degree of the crash is detected. The airbag ECU 22 expands the airbag only when the degree of the crash is heavy.

The acceleration sensor may be provided with a piezoresistive structure or a semiconductor strain gage structure. The semiconductor strain gage or the Cu—Ni strain gage can be used as the side crash sensor and the crash-severity sensor.

The passenger sensor 11 may comprise a load sensor or a CCD sensor. The load sensor may comprise strain gage or electronic contacts. Theses sensors are embedded in the seat or mounted on the seat mount base. Moreover, a load sensor such as a mat sensor arranged in the polyurethane form in the seat provides a more complicated information of the passenger (the seating condition). For example, it can be detected whether the passenger sits forward in the seat, sits back in the seat, or sits with position shift toward the door.

The memory 122 comprises a flash memory. However, the memory 122 may comprise a magnetic hard disc drive, an magnetic optical disk drive with MO disk, or a RAM with battery backup as the non-volatile memory 122. However, in considerations of damage by the crash, it is desirable to use the flash memory or a memory stick including a semiconductor memory without mechanical structure. Thus, the non-volatile memory holds the data regarding the passenger after power off.

[Modifications]

In the above-mentioned embodiment, the latest piece of said data regarding the passenger is stored in the non-volatile memory 122 when then crash is detected. However, it is also possible that the data regarding the passenger is periodically stored in the non-volatile memory 122 and inhibits to overwrite the data in the non-volatile memory 122 when the crash is detected.

Moreover, the passenger detection CPU 121 has a temporary memory (RAM) 121a to periodically hold said data regarding the passenger in the temporary memory, and holds the data regarding the passenger from said temporary memory 121a in the non-volatile memory 122 when the crash is detected.

Moreover, the passenger protection apparatus stores the data of the passenger sensor signal 4 showing the waveform 41 prior to the crash, the type-of-passenger signal 6 showing the waveform 61 up to the crash and further stores the crash sensor processing output 5, the crash trigger signals 51 or 51b just after, when, or during the crash (including the timing t1) in response to the crash trigger signal 51 or 51b just after the detected crash in the non-volatile memory 122 in response to the crash trigger signal 51 or 51b while the crash sensor processing output 5 exceeds the predetermined crash level $TH_H$ or $TH_L$ or a predetermined interval. Thus, the stored data are held after the power off. Thus, the held data is readable after the crash to be used for accident analysis.

What is claimed is:

1. A passenger protection apparatus for a motor vehicle comprising:

an airbag system having a crash sensor and an airbag for generating a crash trigger signal when a crash is detected;

a passenger detection system for detecting said passenger in said motor vehicle to generate data regarding said passenger; and data holding means having a non-volatile memory for holding said data up to said detected crash in said non-volatile memory in response to said crash trigger signals, the passenger detection system comprising a passenger sensor for detecting said passenger to generate a passenger sensor signal and type detection means for detecting a type of said passenger on the basis of said passenger sensor signal, the passenger sensor signal and the type of the passenger being held in the data holding means as the data.

2. The passenger protection apparatus as claimed in claim 1, wherein said passenger detection system comprises processing circuit that processes said passenger sensor signal to periodically output said data and an intermediate processing result obtained while said sensor signal is processed, and wherein said data holding means further holds said intermediate processing results periodically outputted from said processing circuit up to said detected crash when said crash is detected.

3. The passenger protection apparatus as claimed in claim 1, wherein said airbag system further comprises an airbag electronic control unit responsive to said crash trigger signal, said airbag being controlled by said airbag electronic control unit, and said passenger detection system comprises a passenger electronic control unit for processing said passenger sensor signal to generate said data.

4. The passenger protection apparatus as claimed in claim 3, wherein said airbag electronic control unit includes an acceleration sensor, an airbag control central processing unit, and an airbag communication interface, and said passenger detection electronic control unit includes a memory, a passenger detection central processing unit, and a passenger detection communication interface coupled to said airbag communication interface.

5. The passenger protection apparatus as claimed in claim 4, wherein said airbag electronic control unit processes the outputs from said crash sensor and said acceleration sensor to generate an operation value indicative of a magnitude of said crash and generates said crash trigger signal when said operation value exceeds a light crash level and sends said crash trigger signal only to said passenger detection electronic control unit, and supplies said crash trigger signal to said passenger detection electronic control unit and to said airbag when said operation value exceeds a heavy crash level which is higher than said light crash level.

6. The passenger protection apparatus as claimed in claim 3, wherein when said passenger detection electronic control unit receives said crash trigger signal, said passenger detection electronic control unit sends said data to said airbag electronic control unit, and said airbag electronic control unit sends said crash trigger signal to said airbag on the basis of said data from said passenger detection electronic control unit.

7. The passenger protection apparatus as claimed in claim 1, wherein said data holding means holds a latest piece of said data in said non-volatile memory when said crash is detected.

8. The passenger protection apparatus as claimed in claim 1, wherein said data holding means periodically holds said data in said non-volatile memory and inhibits rewriting said data in said non-volatile memory when said crash is detected.

9. The passenger protection apparatus as claimed in claim 1, wherein said data holding means h as a temporary memory, periodically holds said data in said temporary memory, and holds the data from said temporary memory in said non-volatile memory in response to said crash trigger signal.

10. The passenger protection apparatus as claimed in claim 1, wherein said passenger detection system includes a sensor for detecting a load by said passenger, said data holding means holds said output of said sensor as said data.

11. The passenger protection apparatus as claimed in claim 1, wherein said passenger detection system includes a sensor for detecting a load by said passenger and processes an output of the sensor to have a waveform-shaped signal, said data holding means holds a result from said processed output as said data.

12. The passenger protection apparatus as claimed in claim 1, further comprising a processing circuit for processing a sensor signal from said crash sensor to output processing result, wherein said data holding means further holds said processing result in said non-volatile memory just after said detected crash in response to said crash trigger signal including the timing of the detected crash.

13. The passenger protection apparatus as claimed in claim 1, wherein said passenger detection system comprises a passenger sensor for detecting said passenger to generate said data.

14. The passenger protection apparatus as claimed in claim 1, wherein said passenger detection system generates said data directly obtained from a result of detecting said passenger.

15. The passenger protection apparatus as claimed in claim 1, wherein said data holding means holds said data only for a predetermined interval up to said detected crash in said non-volatile memory in response to said crash trigger signal.

* * * * *